United States Patent

Tsuge

[11] Patent Number: 6,102,609
[45] Date of Patent: Aug. 15, 2000

[54] CABLE JOINT STRUCTURE

[75] Inventor: Yoshikatsu Tsuge, Nagoya, Japan

[73] Assignee: Chuo Hatsujo Kabushiki Kaisha, Aichi-ken, Japan

[21] Appl. No.: 09/130,463

[22] Filed: Aug. 7, 1998

[30] Foreign Application Priority Data

Aug. 7, 1997 [JP] Japan .................................. 9-213691

[51] Int. Cl.[7] .................................................. B25G 3/00
[52] U.S. Cl. ........................ 403/301; 403/319; 74/502.6
[58] Field of Search ....................... 74/502.6; 403/300, 403/301, 302, 319, 329, 326, 363, 353

[56] References Cited

U.S. PATENT DOCUMENTS

| | | | |
|---|---|---|---|
| 3,505,900 | 4/1970 | Stahr | 74/502.4 |
| 4,887,930 | 12/1989 | Chaczyk et al. | 74/502.4 X |
| 5,080,434 | 1/1992 | Locher | 74/502.4 X |
| 5,144,856 | 9/1992 | Roca | 74/502.4 X |
| 5,662,369 | 9/1997 | Tsuge | 296/66 |
| 5,664,462 | 9/1997 | Reasoner | 74/502.4 |
| 5,941,591 | 8/1999 | Tsuge et al. | 296/65.09 |

*Primary Examiner*—B. Dayoan
*Assistant Examiner*—Danielle Somrak
*Attorney, Agent, or Firm*—Sughrue, Mion, Zinn, Macpeak & Seas, PLLC

[57] ABSTRACT

In a cable joint structure, a first casing has a first rail member. A first end portion has a lug portion directed opposite to the first rail, and connected to one end of a first cable so that the first end portion moves along the first rail member. A second casing has a second rail member. A second end portion has a recess portion into which the lug portion interfits from a direction opposite to the second rail member, and connected to one end of a second cable so that the second end portion moves along the second rail member. A lock member is provided to unite the first casing to the second casing with the first rail member located to face the second rail member.

26 Claims, 5 Drawing Sheets

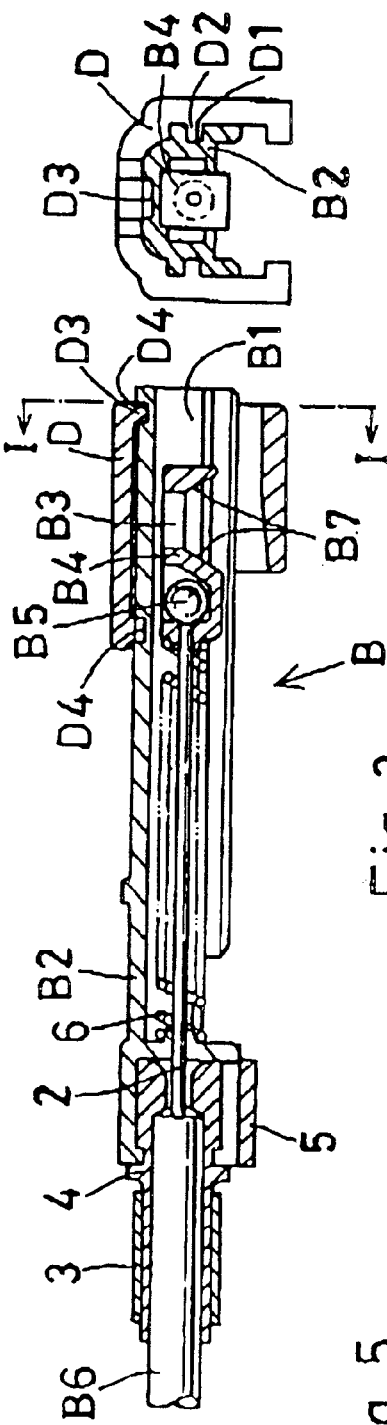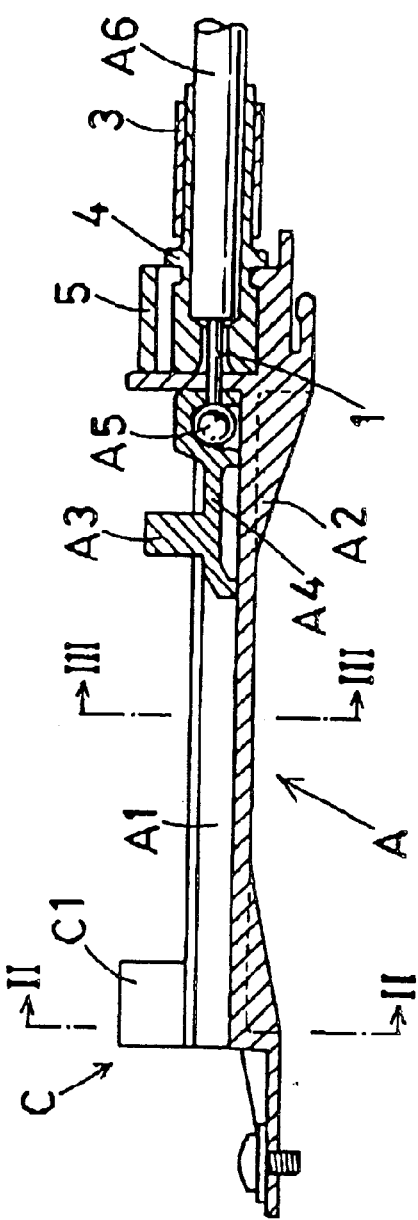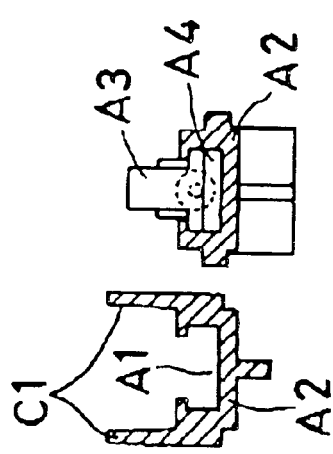

CABLE JOINT STRUCTURE

BACKGROUND OF THE INVENTION

1. Field of the Invention

The invention relates to a cable joint structure used to detachably connect two cables.

2. Description of Prior Art

In a cable joint structure of FIG. 14, there has been provided a rectangular casing (J1) in which a first casing cap (J4) is disposed to attach a first outer casing (J3) of a first cable (J2) to one side of the casing (J1). To one end of the first cable (J2), a first end portion (J6) is connected in the manner to slide within the casing (J1). The first end portion (J6) has a key-shaped hole (J5). A second casing cap (J9) is provided to attach a second outer casing (J8) of a second cable (J7) to the other side of the casing (J1). To one end of the second cable (J7), a spherical portion (J10) is connected as a second end portion which interfits into the key-shaped hole (J5). A lid cap (J11) is provided to shield an open ended area of the casing (J1).

Upon connecting the first cable (J2) to the second cable (J7), the spherical portion (J10) of the second cable (J7) is brought into the key-shaped hole (J5) of the first end portion (J6), and then the second casing cap (J9) is attached to the casing (J1). Finally, the lid cap (J11) is clamped on the casing (J1) to secure the connected portions against removal.

This, however, requires the three-step procedure which results in a complicated and time-consuming operation. For this reason, it is difficult to handle the cable joint structure particularly for those who are not accustomed to operating the cable joint structure.

Therefore, the present invention has made with the above drawbacks in mind. It is a main object of the invention to provide a cable joint structure which is capable of quickly connecting and disconnecting with ease, and easy to handle for those who are unaccustomed to operating the cable joint structure.

SUMMARY OF THE INVENTION

According to the present invention, when connecting the first cable to the second cable; the lug portion of the first end portion is brought into the recess portion of the second end portion with the first rail member located to face the second rail member. The lock member unites the first casing and the second casing to connect the two cables together.

Upon disconnecting the first cable from the second cable, the lock member dislodges the lug portion from the recess so as to make the first cable released from the second cable. With the use of the lock member, it is possible to readily connect and disconnect the cables so as to make a cable joint structure easy to handle.

With the first outer casing rotationally connected to the first casing so that the former can swivel against the latter, it is possible for the casing to orient freely irrespective of the torsional direction which the first outer casing is oriented.

With the first cable rotationally connected to the first end portion so that the former can swivel against the latter, it is possible for the first end portion to orient freely irrespective of the torsional direction which the first cable is oriented. This obviates the torsion between the first casing and the first end portion so as to substantially eliminate the torsional friction therebetween.

In the same manner as described above, with the second outer casing rotationally connected to the second casing so that the former can swivel against the latter, it is possible for the casing to orient freely irrespective of the torsional direction which the second outer casing is oriented.

With the second cable rotationally connected to the second end portion so that the former can swivel against the latter, it is possible for the second end portion to orient freely irrespective of the torsional direction which the second cable is oriented. This obviates the torsion between the second casing and the second end portion so as to substantially eliminate the torsional friction therebetween.

Due to the elimination of the torsional friction between the first casing (second casing) and the first end portion (second end portion), it is possible to move the connected cables smoothly with the least burden.

With the first end portion (second end portion) embraced by the first rail member (second rail member), it is possible to retain the first end portion (second end portion) in position even when the first rail member (second rail member) turns downward. This eliminates the necessity of holding the end portions by one hand, thus making it possible to respectively connect and disconnect the cables with a single hand operation.

With the means to place the first and second casings in position, it is possible to easily locate the position in which the first casing faces the second casing.

With the lock member provided as a slide lock which slides along the lengthwise direction of the first and second casings, it is possible to carry out the locking and unlocking operation with a limited space.

With the slide lock embracing the jagged rail portion provided on the first casing to firmly connect the first casing to the second casing, it is possible to carry out the locking and unlocking operation repeatedly for an extended period of time.

With the first end portion or second end portion urged in one direction by the spring member, it is possible to return the first and second end portions to the corresponding normal positions, thus positionally adjusting the first and second casings to positively interfit the lug portion into the recess portion.

With the inner wall of the recess portion tapered in such a manner as to progressively increase its diametrical dimension as moving outward, it is easy to introduce the lug portion to the recess portion upon interfitting the lug portion into the recess portion.

BRIEF DESCRIPTION OF THE DRAWINGS

FIG. 1 is a longitudinal cross sectional view of a first joint unit according to an embodiment of the invention;

FIG. 2 is an end view of the first joint unit looked from the line I—I of FIG. 1;

FIG. 3 is a longitudinal cross sectional view of a second joint unit according to the embodiment of the invention;

FIG. 4 is a latitudinal cross sectional view taken along the line II—II of FIG. 3;

FIG. 5 is a latitudinal cross sectional view taken along the line III—III of FIG. 3;

DETAILED DESCRIPTION OF THE PREFERRED EMBODIMENTS OF THE INVENTION

Figure 7:
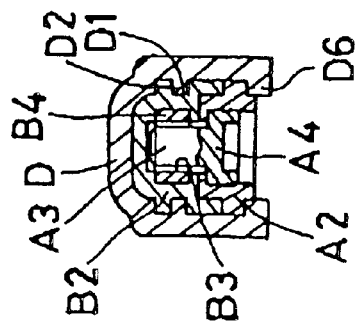
FIG. 7 is a latitudinal cross sectional view taken along the line IV—IV of FIG. 6.

Referring to FIGS. 1 through 5 which show a cable joint structure used to connect and disconnect cables when carrying out a teleoperation. The cable joint structure detachably connects a first cable 1 and a second cable 2, and having a first joint unit (A) and a second joint unit (B). The first joint unit (A) is provided to guide the first cable 1 therealong, and the second joint unit (B) is provided to guide the second cable 2 therealong.

The first joint unit (A) has a first casing (A2) in which a first rail member (A1) is provided in the lengthwise direction. Within the first casing (A2), a first end portion (A4) is provided to slidably move along the first rail member (A1). The first end portion (A4) has a lug portion (A3) protracted upward therefrom and is connected to one end of the first cable 1.

As shown in FIG. 4, the first rail member (A1) has such a cross section as to embrace the first end portion (A4) so as to retain the first end portion (A4) within the first rail member (A1) irrespective of which position the first casing (A2) occupies.

One end of the first cable 1 has a spherical ball (A5) which is pivotably enclosed within the first end portion (A4) in order to make the first cable 1 swivel around its center. Conversely, it makes it possible to swivel the first end portion (A4) about both the spherical ball (A5) and the first cable 1, thus resultantly making the first cable 1 swivel against the first end portion (A4).

A first outer casing (A6) of the first cable 1 is fixed at one end to a casing cap 4 by way of a caulking sleeve 3. With a U-shaped cap lock 5 attached to the casing cap 4 (FIGS. 8~13), it is possible to pivotably connect the casing cap 4 to the first casing (A2) to swivel it against the first casing (A2).

With the first outer casing (A6) rotationally connected to the first casing (A2) so that the former can swivel against the latter, it is possible for the casing (A2) to orient freely irrespective of the torsional direction in which the first outer casing (A6) is oriented.

With the first cable 1 rotationally connected to the first end portion (A4) so that the former can swivel against the latter, it is possible for the first end portion (A4) to orient freely irrespective of the torsional direction which the first cable 1 is oriented. This obviates the torsion between the first casing (A2) and the first end portion (A4) so as to substantially eliminate the torsional friction therebetween.

The second joint unit (B) has a second casing (B2) in which a second rail member (B1) is provided in the lengthwise direction. Within the second casing (B2), a second end portion (B4) is provided to slidably move along the second rail member (B1). The second end portion (B4) has a recess portion (B3) into which the lug portion (A3) is to be interfit from outside the second rail member (B1), and is connected to one end of the second cable 2.

As shown in FIGS. 1 and 2, the second rail member (B1) has such a cross section as to embrace the second end portion (B4) so as to retain the second end portion (B4) within the second rail member (B1) irrespective of which position the second casing (B2) occupies.

One end of the second cable 2 has a spherical ball (B5) which is pivotably enclosed within the second end portion (B4) in order to make the second cable 2 swivel around its center. Conversely, it makes possible to swivel the second end portion (B4) about both the spherical ball (B5) and the second cable 2, thus resultantly making the second cable 2 swivel against the second end portion (B4).

In the same manner as the first outer casing (AG), a second outer casing (B6) of the second cable 2 is fixed at one end to the casing cap 4 by way of the caulking sleeve 3. With the U-shaped cap lock 5 attached to the casing cap 4 (FIGS. 8~13), it is possible to pivotably connect the casing cap 4 to the second casing (B2) to swivel it against the second casing (B2).

With the second outer casing (B6) rotationally connected to the second casing (B2) so that the former can swivel against the latter, it is possible for the casing (B2) to orient freely irrespective of the torsional direction which the second outer casing (B6) is oriented.

With the second cable 2 rotationally connected to the second end portion (B4) so that the former can swivel against the latter, it is possible for the second end portion (B4) to orient freely irrespective of the torsional direction which the second cable 2 is oriented, This obviates the unfavorable torsion between the second casing (B2) and the second end portion (B4) so as to substantially eliminate the torsional friction therebetween.

Upon uniting the first casing (A2) and the second casing (B2), the first rail member (A1) and the second rail member (B1) are placed to face each other so as to interfit the lug portion (A3) into the recess portion (B3).

In order to locate the first rail member (A1) to face the second rail member (B1), a positioning member (C) is provided on the first casing (A2) and the second casing (B2). The positioning member (C) has a pair of studs (C1) provided on the first casing (A2) and a constricted section (C2) provided on the second casing (B2) as a guide groove (D1) described hereinafter. By placing the constricted section (C2) between the studs (C1), it is possible to readily locate the position in which the first rail member (A1) faces the second rail member (B1).

Figure 8:
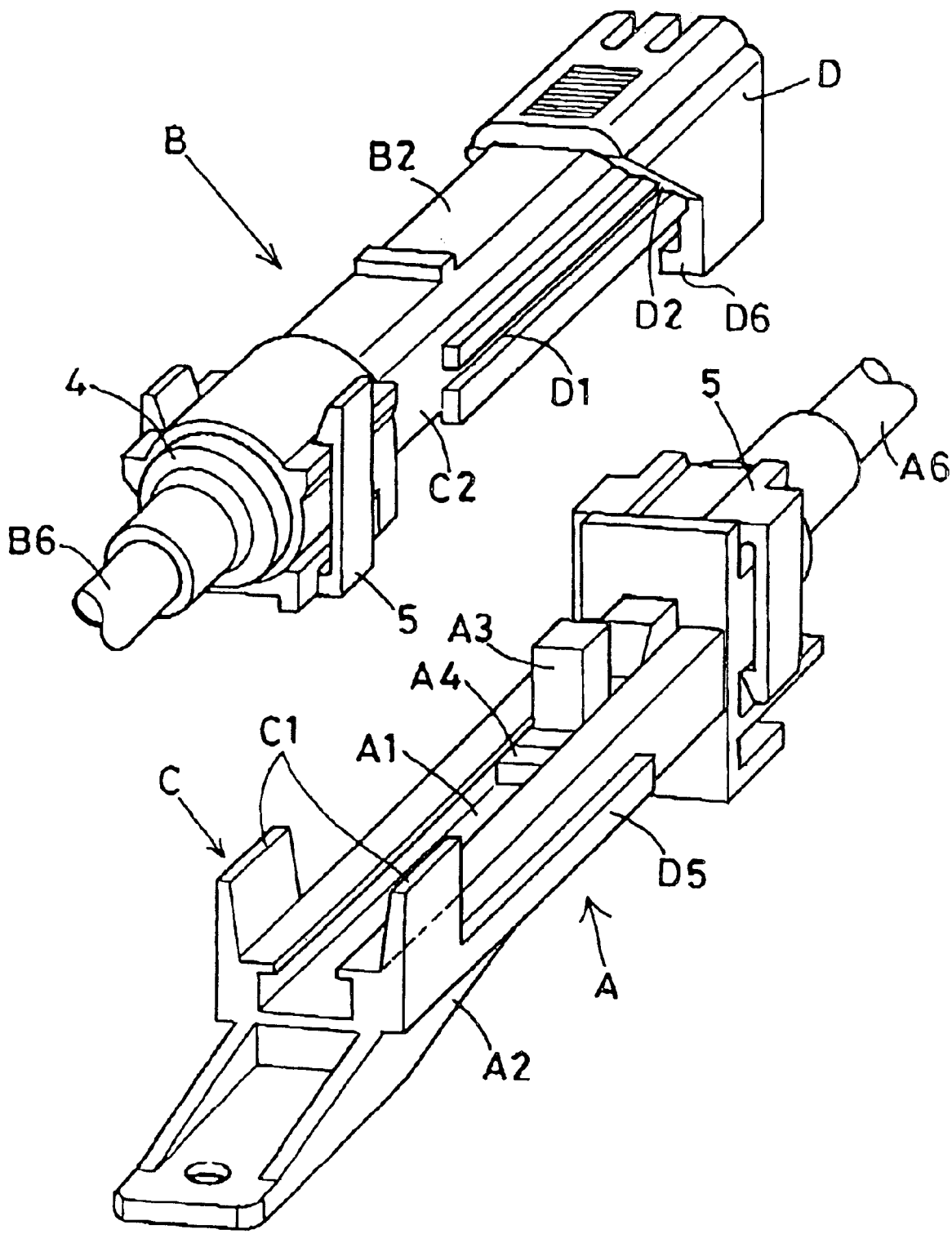
FIG. 8 is an exploded perspective view of the cable joint structure.
Figure 12:
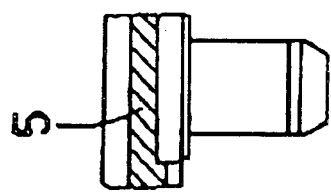
FIG. 12 is a longitudinal cross sectional view taken along the line VI—VI of FIG. 11.
Figure 11:
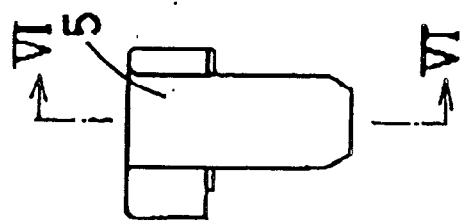
FIG. 11 is a side plan view of the cap lock.
Figure 9:
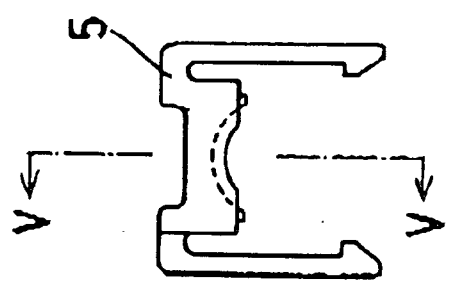
FIG. 9 is a plan view of a cap lock.
Figure 13:
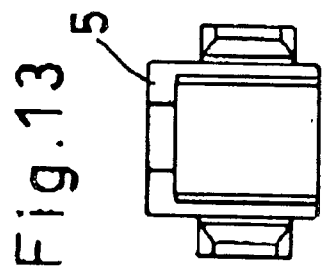
FIG. 13 is a plan view of the cap lock.
Figure 10:
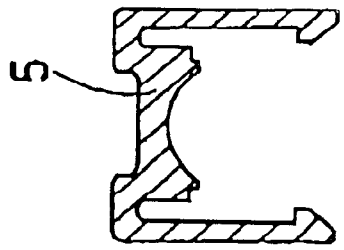
FIG. 10 is a longitudinal cross sectional view taken along the line V—V of FIG. 9.
Figure 14:
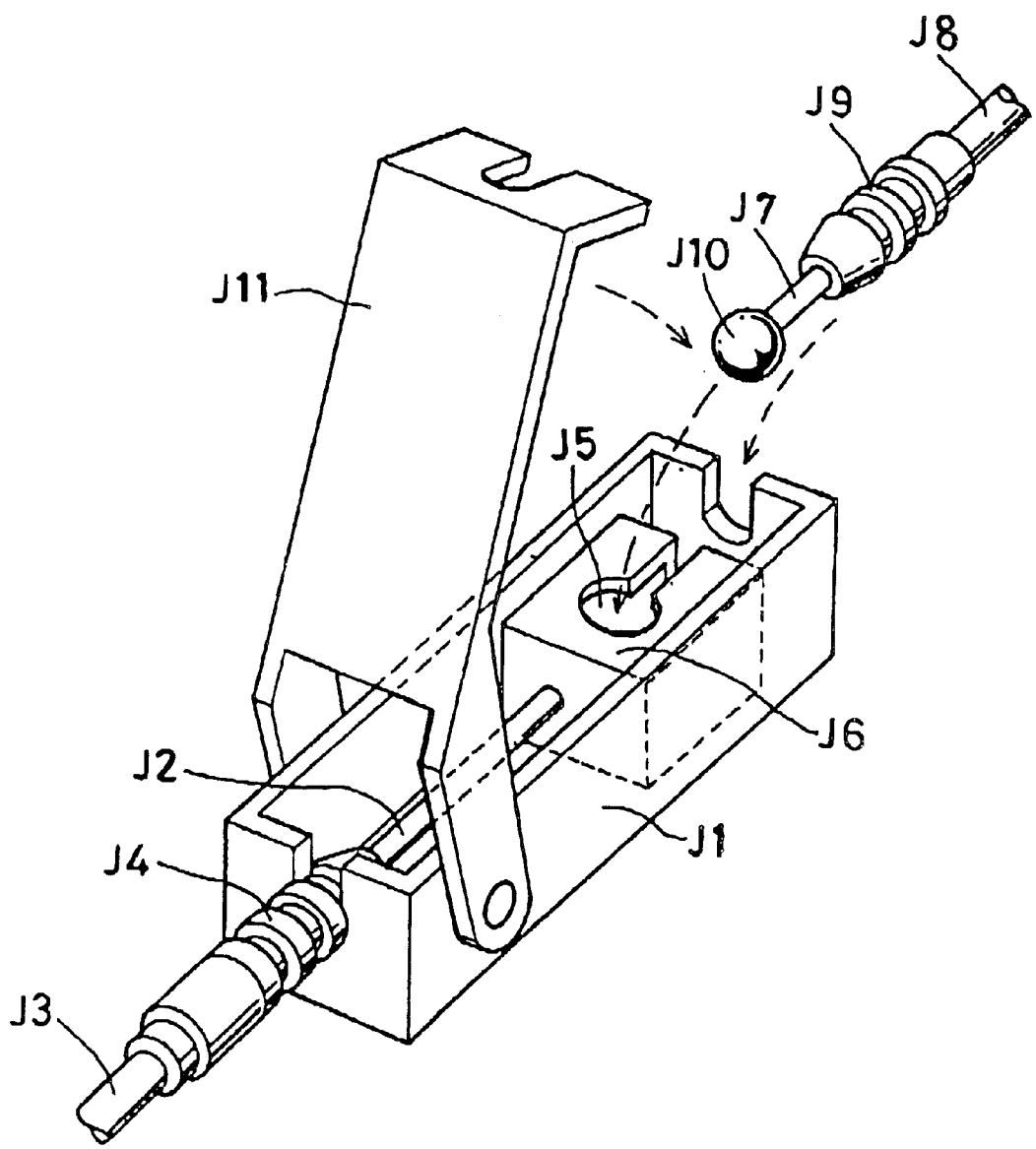
FIG. 14 is an exploded perspective view of a prior cable joint structure.

As shown in FIG. 8, a slide lock (D) is provided on the second casing (B2) to unite the first casing (A2) and the second casing (B2) with the first rail member (A1) located to face the second rail member (B1). The slide lock (D) is inverted U-shaped in cross section, and arranged to slidably move in the lengthwise direction of the second casing (B2). In order to enable the slide lock (D) to move lengthwisely, an inner wall of the slide lock (D) has a lengthwise guide lining (D2) which is slidably placed on a guide groove (DI) formed on an elevational side of the second casing (B2).

In this instance, as evidently shown in FIG. 1, a protrusion (D3) is provided on an inner side of a head portion of the slide lock (D) to selectively fit into two pits (D4) to respectively place the slide lock (D) in a locked position and unlocked position.

With the second casing (B2) placed on the first casing (A2), the slide lock (D) moves from the unlocked position to the locked position. In the locked position, an underside of the slide lock (D) has a claw portion (D6) engaged with a jagged rail (D5) provided on the elevational side of the first casing (A2).

Upon moving the slide lock (D) from the locked position to the unlocked position, the claw portion (D6) disengages from the jagged rail (D5) to release the second casing (B2) from the first casing (A2).

With the claw portion (D6) engaged with or disengaged from the jagged rail (D5) upon uniting or disuniting the second casing (B2) and the first casing (A2), it is possible to positively carry out the locking and unlocking operation for an extended period of time.

Figure 6:
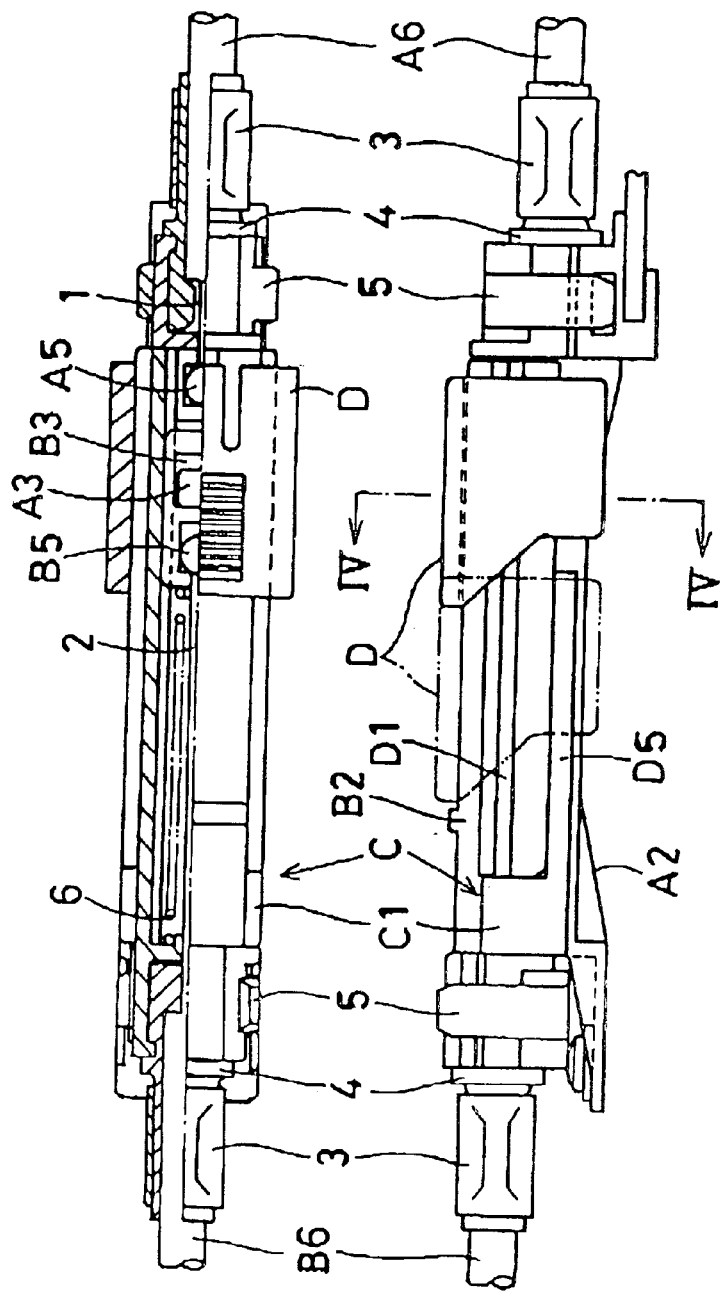
FIG. 6 is a plan view of a cable joint structure in which the first joint unit and second joint unit are united.

As shown in FIGS. 1 and 6, a helical compression spring 6 is provided within the second casing (B2) to urge the second end portion (B4) in such a direction that the recess portion (B3) meets the lug portion (A3). Due to the presence of the helical spring 6, it is possible to automatically interfit the lug portion (A3) into the recess portion (B3) to connect the first cable 1 to the second cable 2 only by locating the second casing (B2) in position to face the first casing (A2).

An inner wall which defines the recess portion (B3) is funnel-shaped to form a tapered portion (B7), a diameter of which progressively increases outwardly, Under the presence of the tapered portion (B7), it is easy to introduce the lug portion (A3) to the recess portion (B3) upon interfitting the lug portion (A3) into the recess portion (B3) when locating the second casing (B2) in position to face the first casing (A2).

With the structure thus far described, the first casing (A2) is brought to the second casing (B2) with the first rail member (A1) located to face the second rail member (B1). This automatically interfits the lug portion (A3) into the recess portion (B3) of the second end portion (B4). When moving the slide lock (D) from the unlocked position to the locked position, the slide lock (D) engages the claw portion (b6) with the jagged rail (D5) of the first casing (A2), thus uniting the first casing (A2) and the second casing (B2) to positively connect the first cable 1 to the second cable 2 with two-step operation.

Upon disconnecting the first cable 1 from the second cable 2, the slide lock (D) moves back from the locked position to the unlocked position so that the claw portion (D6) disengages from the jagged rail (D5) to disunite the first casing (A2) and the second casing (B2) with a single step operation.

Advantages of the Invention (i) With the two-step operation necessary to connect the first cable 1 to the second cable 2 as opposed the prior art in which the three-step operation has been demanded, it is possible to readily complete the wire connecting procedures even for those who are unaccustomed to the cable joint operation.

(ii) Due to the first end portion (A4) and the second end portions (B4) each retained by the first rail members (A1) and the second rail member (B1), it is possible to connect and disconnect the cables 1, 2 with a single hand operation because there is no necessity to hold the first end portion (B4) and the second end portions (A4) during the operation.

(iii) Because of no torsional force induced between the casing (A2, B2) and the end portion (A4, B4), there is no possibility to appear the torsional friction therebetween. This makes it possible to move the cables 1, 2 smoothly with the least burden.

Modification Form

It is to be observed that the present cable joint structure can be used to connect and disconnect two or more paired cables instead of only one paired cables 1, 2.

What is claimed is:

1. A cable joint structure comprising:
   (a) a first casing having, a first rail member;
   (b) a first end portion having a lug portion, a said first end portion being connected to one end of a first cable and being movable along said first rail member;
   (c) a second casing having a second rail member;
   (d) a second end portion having a recess portion which receives said lug portion, said second end portion being connected to one end of a second cable and being movable along said second rail member; and
   (e) a lock member provided to unite said first casing to said second casing with said first rail member facing said second rail member, wherein said first cable is rotationally connected to said first end portion provided on said first rail member, and an outer casing of said first cable is rotationally connected to said first casing, said second cable is rotationally connected to said second end portion provided on said second rail member, and an outer casing of said second cable is rotationally connected to said second casing.

2. A cable joint structure as recited in claim 1, wherein a positioning member is provided to place said first casing and said second casing in a position in which said first casing faces said second casing.

3. A cable joint structure as recited in claim 1, wherein said lock member is a slide lock which moves along a lengthwise direction of said first casing or said second casing.

4. A cable joint structure as recited in claim 3, wherein said slide lock moves along the lengthwise direction of said second casing, and said slide lock embraces a jagged rail portion provided on said first casing to firmly connect said first casing to said second casing by moving said slide lock with said first casing placed to face said second casing.

5. A cable joint structure as recited in claim 1, wherein at least one of said first end portion and said second end portion is urged in one direction by a spring so that said recess portion and said lug portion are aligned.

6. A cable joint structure as recited in claim 1, wherein an inner wall of said recess portion has a tapered portion, a diametrical dimension of which progressively increases outwardly.

7. A cable joint structure as recited in claim 6, wherein said inner wall of said recess portion forms funnel-shaped configuration.

8. A cable joint structure as recited in claim 1, wherein a positioning member is provided to place said first casing and said second casing in position in which said first casing faces said second casing.

9. A cable joint structure as recited in claim 1, wherein said lock member is a slide lock which moves along a lengthwise direction of said first casing or said second casing.

10. A cable joint structure as recited in claim 2, wherein said lock member is a slide lock which moves along a lengthwise direction of said first casing or said second casing.

11. A cable joint structure as recited in claim 1, wherein at least one of said first end portion and said second end portion is urged in one direction by a spring so that said recess portion and said lug portion are aligned.

12. A cable joint structure as recited in claim 2, wherein at least one of said first end portion and said second end portion is urged in one direction by a spring so that said recess portion and said lug portion are aligned.

13. A cable joint structure as recited in claim 3, wherein at least one of said first end portion and said second end portion is urged in one direction by a spring so that said recess portion and said lug portion are aligned.

14. A cable joint structure as recited in claim 4, wherein at least one of said first end portion and said second end portion is urged in one direction by a spring so that said recess portion and said lug portion are aligned.

15. A cable joint structure as recited in claim 1, wherein an inner wall of said recess portion has a tapered portion, a diametrical dimension of which progressively increases outwardly.

16. A cable joint structure as recited in claim 2, wherein an inner wall of said recess portion has a tapered portion, a diametrical dimension of which progressively increases outwardly.

17. A cable joint structure as recited in claim 3, wherein an inner wall of said recess portion has a tapered portion, a diametrical dimension of which progressively increases outwardly.

18. A cable joint structure as recited in claim 4, wherein an inner wall of said recess portion has a tapered portion, a diametrical dimension of which progressively increases outwardly.

19. A cable joint structure as recited in claim 5, wherein an inner wall of said recess portion has a tapered portion, a diametrical dimension of which progressively increases outwardly.

20. A cable joint structure comprising:
(a) a first casing having a first rail member;
(b) a first end portion having a lug portion, said first end portion being connected to one end of a first cable and being movable along said first rail member;
(c) a second casing having a second rail member;
(d) a second end portion having a recess portion which receives said second end portion being connected to one end of a second cable and being movable along said second rail member; and
e) a lock member provided to unite said first casing to said second casing with said first rail member facing said second rail member, wherein said first rail member has a claw portion which slidably engages a first guide groove provided on said first end portion, and said second rail member has a claw portion which slidably engages a second guide groove provided on said second end portion.

21. A cable joint structure comprising:
(a) a first casing having a first rail member;
(b) a first end portion having a lug portion, said first end portion being connected to one end of a first cable and being movable along said first rail member;
(c) a second casing having a second rail member;
(d) a second end portion having a recess portion which receives said lug portion, said second end portion begins connected to one end of a second cable and behind movable along, said second rail member;
(e) a lock member provided to unite said first casing to said second casing with said first rail member facing said second rail member, wherein said first cable is rotationally connected to said first end portion provided on said first rail member, and an outer casing of said second cable is rotationally connected to said second end portion provided on said second rail member, and an outer casing of said second cable is rotationally connected to said second casing, and
said first cable is pivotably connected to said first end portion by way of a first spherical ball, and said second cable is pivotably connected to said second end portion by way of a second spherical ball.

22. A cable joint structure comprising:
a first casing having a first rail member;
a first end portion having a lug portion extending in a direction different than a longitudinal direction of said first rail member, said first end portion being connected to one end of a first cable and being movable along said first rail member;
a second casing having a second rail member;
a second end portion having a recess portion which receives said lug portion, said second end portion being connected to one end of a second cable and being movable along said second rail member; and
a lock member provided to unite said first casing to said second casing with said first rail member facing said second rail member.

23. The cable joint structure of claim 22, wherein said direction in which said lug portion extends is substantially perpendicular to said longitudinal direction of said first rail member.

24. A cable joint stricture comprising:
a first casing having a first rail member;
a first end portion having a lug portion, said first end portion being connected to one end of a first cable and being movable on a surface of said first rail member;
a second casing having a second rail member;
a second end portion having a recess portion which receives said lug portion, said second end portion being connected to one end of a second cable and being movable on a surface of said second rail member; and
a lock member provided to unite said first casing to said second casing with said first rail member located to face said second rail member.

25. A cable joint structure comprising:
a first casing having a first rail member;
a first end portion having a lug portion, said first end portion being connected to one end of a first cable and being movable along said first rail member;
a second casing having a second rail member;
a second end portion having a recess portion which receives said lug portion, said second end portion being connected to one end of a second cable and being movable along said second rail member; and
a lock member provided to unite said first casing to said second casing with said first rail member facing said second rail member, wherein said lock member moves in a longitudinal direction of said first and second casing to unite said first casing to said second casing.

26. A cable joint structure comprising:
(a) a first casing having a first rail member;
(b) a first end portion having a lug portion, said first end portion being connected to one end of a first cable and being movable along said first rail member;
(c) a second casing having a second rail member;
(d) a second end portion having a recess portion which receives said lug portion, said second end portion being connected to one end of a second cable and being movable along said second rail member;
(e) a lock member provided to unite said first casing to said second casing with said first rail member facing said second rail member, wherein
said first cable is rotationally connected to said first end portion provided on said first rail member, an outer casing of said second cable is rotationally connected to said first casing, said second cable is rotationally connected to said second end portion provided on said second rail member, an outer casing of said second cable is rotationally connected to said second casing; and
said first rail member has a claw portion which slidably engages a first guide groove provided on said first end portion, and said second rail member has a claw portion which slidably engages a second guide groove provided on said second end portion.

\* \* \* \* \*